United States Patent [19]

Okuyama et al.

[11] 3,846,340

[45] Nov. 5, 1974

[54] CATALYTIC COMPOSITION FOR TREATMENT OF EXHAUST GASES AND A METHOD OF PRODUCTION THEREOF

[75] Inventors: Toshiki Okuyama; Hiroko Iwabuchi, both of Fujisawa City; Mitsuyoshi Sano, Miura City; Shinichi Manabe, Yokosuka; Junichi Mine; Mikiko Sato, both of Tokyo, all of Japan

[73] Assignee: Nissan Motor Company, Limited, Yokohama City, Japan

[22] Filed: Oct. 20, 1972

[21] Appl. No.: 299,332

[30] Foreign Application Priority Data
Oct. 25, 1971  Japan.............................. 46-83897

[52] U.S. Cl.............. 252/455 R, 252/461, 252/465, 252/466 J, 252/469, 252/470, 423/213.2
[51] Int. Cl............................................ B01j 11/22
[58] Field of Search........ 252/461, 465, 469, 455 R; 423/213

[56] References Cited
UNITED STATES PATENTS

| | | | |
|---|---|---|---|
| 3,179,488 | 4/1965 | Appell | 423/213 |
| 3,207,704 | 9/1965 | Stephens | 423/213 |
| 3,493,325 | 2/1970 | Roth | 252/465 X |
| 3,524,721 | 8/1970 | Stephens | 423/213 |

*Primary Examiner*—Daniel E. Wyman
*Assistant Examiner*—W. J. Shine

[57] ABSTRACT

A catalyst composition consisting of oxides of nickel, chromium and zirconium which are carried on a carrier of a monolithic structure or on tablets, pellets or the like. The catalyst composition may further comprise one of manganese, zinc, copper and iron oxides so as to provide further increased activity and durability. A method of producing the catalyst of the type described above is provided, in which the metal oxides are formed from the corresponding metal salts or metal hydroxides by sintering.

21 Claims, No Drawings

CATALYTIC COMPOSITION FOR TREATMENT OF EXHAUST GASES AND A METHOD OF PRODUCTION THEREOF

This invention relates to catalytic compositions for treatment of exhaust gases emitted from various industrial plants and internal combustion engines and more particularly to catalytic compositions comprising oxides of nickel, chromium and zirconium on a carrier. This invention also relates to a method of producing a catalyst having the catalyst compositions mentioned above.

The exhaust gases emitted from internal combustion engines usually contain hydrocarbons, carbon monoxide, carbonyl compounds, etc., resulting from partial or incomplete combustion of fuels, and nitrogen oxides produced by the reaction between oxygen and nitrogen gases contained in the air used for the combustion of fuels at elevated temperatures. These gases cause a serious problem of air pollution from industrial plants as well as the waste gases. From a view point of preventing air pollution caused by the emission of these noxious compounds, it is required to render the exhaust gases harmless by oxidizing carbon monoxide, hydrocarbons, etc., in the exhaust gases and by reducing or decomposing the nitrogen oxides before the exhaust gases are released into the open air. The above-mentioned oxidation and reduction reactions can be accomplished by using a catalyst.

A catalyst used to accomplish these reactions, particularly regarding exhaust gases of internal combustion engines of motor vehicles, should meet the following requirements:
1. Prolonged active life showing optimum reactivity for oxidation and reduction of the noxious compounds over as long a period of time as possible.
2. Low-temperature activity, viz., capability of being active at relatively low temperatures.
3. Satisfactory conversion efficiency for oxidizing combustible compounds and reducing nitrogen oxides contained in the exhaust gases within a temperature range from about 200°C to 700°C.
4. Sufficient mechanical strength, in particular resistance to wear and to mechanical shocks and vibrations while in operation.
5. Minimized resistance to the flow of exhaust gases through the catalyst.
6. No generation of noxious secondary reaction products.

Of these, the requirements (2), (4) and (5) will not be satisfactorily met by conventional catalysts in the form of pellets or tablets. However, the requirements are all met by a catalyst in the form of a block having a volume equivalent to from several tenths of a liter to liters and having a number of through passages extending in one or two directions. The catalyst of this nature is generally called a "monolithic catalyst" and will be herein referred to as such. The monolithic catalyst typically has a structure having a honeycomb-like or a sieve-like cross-section. In contrast to such a monolithic catalyst, the catalyst in the pellet or tablet form will be called herein a "non-monolithic catalyst". The monolithic catalyst is considered suitable for use particularly in cleaning automotive exhaust gases although the catalyst in the form of pellets or tablets is acceptable for use in the treatment of exhaust gases emanated from industrial plants as well as from internal combustion engines.

The monolithic catalyst can be prepared by any of the following different methods:
i. A mixture of catalytic components and a carrier material is first prepared simply by mixing or by co-precipitation. The mixture is then moulded into a specific monolithic form and sintered to obtain a monolithic catalyst.
ii. Catalytic components are carried on a previously moulded monolithic carrier structure, for example, by a co-precipitation method, and then sintered to form a monolithic catalyst.
iii. A previously moulded monolithic carrier structure is impregnated in a solution containing catalytic components, and then the resultant carrier is sintered to give a monolithic catalyst.

The "monolithic carrier" mentioned above is intended to define a carrier having a specific structure similar to that of the monolithic catalyst defined hereinbefore.

Of the three different methods mentioned above, the methods (i) and (ii) involve various technical problems still to be solved and are unacceptable for practical applications. However, the method (iii) is easy to carry out and suitable for use in the production of a monolithic catalyst being sufficiently active and durable.

Some catalytic agents are presently available for the purpose of reducing or decomposing nitrogen oxides from the exhaust gases emitted from the automotive internal combustion engines, including (a) a catalytic agent containing copper oxide and chromium oxide with or without barium oxide or palladium, (b) a catalytic agent containing iron oxide and chromium oxide with or without barium oxide or zinc oxide, (c) a catalytic agent containing manganese oxide and chromium oxide and (d) a platinum catalyst. These catalytic agents, however, are not fully acceptable because the catalytic agent (a) has a disadvantageously short active or durable life by reason of the copper oxide contained therein, and the catalytic agent (b) disadvantageously produces a relatively large amount of secondary reaction product of ammonia, thus being deficient in its selectivity of the reaction. Moreover, the catalytic agent (c) is poor in its low-temperature activity when used in the presence of moisture as in exhaust gases of automotive internal combustion engines and has also poor durability characteristics. The catalytic agent (d) has extremely low reducing potency of the nitrogen oxide, and disadvantageously produces a relatively large amount of ammonia. Furthermore, few of nickel oxide-containing catalysts including (e), a catalytic agent containing nickel oxide and chromium oxide and (f), a catalytic agent containing nickel oxide, chromium oxide and barium oxide are known. However, these catalytic agents are neither used for decomposition and reduction of nitrogen oxide nor prepared for this purpose. When nitrogen monoxide is reduced or decomposed, it should be taken into consideration that some or all of the nitrogen monoxide is easily converted into ammonia. In this connection, all of the above-mentioned catalytic agents give unsatisfactory results. That is, the prior art catalysts for reducing nitrogen oxides are not intended to suppress the generation of noxious ammonia gas.

Not only is ammonia per se noxious, but also the same is readily oxidized by heating and converted to nitrogen monoxide again. Since the generation of ammonia results in the reduction of the noxious component-removing efficiency of the catalytic type air-pollutant cleaning system, it is required to suppress the generation of ammonia.

It is therefore an object of the present invention to provide a novel catalyst composition suitable for treating air-pollutants emanated from various industrial plants and automotive internal combustion engines.

It is another object of the present invention to provide a catalyst composition which can efficiently reduce or decompose nitrogen oxides into nitrogen and oxygen gases.

It is still another object of the present invention to provide a catalyst composition which can suppress the generation of a secondary reaction product viz., of ammonia resulting from the reaction of nitrogen monoxide and hydrogen or water.

It is further object of the present invention to provide a catalyst composition which retains its activity or potency over a long period of time.

It is another object of the present invention to provide a method of preparing the catalyst of the nature mentioned above.

Other objects and advantages of the present invention will be apparent from the following description.

In order to attain the objects mentioned above, research and development works have been carried out by the present inventors to find a catalyst composition which is used to render harmless noxious components, particularly nitrogen oxides, contained in exhaust gases emitted from internal combustion engines and industrial plants. As a result of efforts in such research and development, it has been found that a catalyst composition containing the oxides of nickel, chromium and zirconium shows satisfactory activity or potency, sufficient endurance and excellent reducing capability.

The reasons for the excellent reducing capability, endurance and activity or potency of the catalyst composition mentioned above can not be fully explained at this stage of research and development. However, these are considered to be due to the following reasons.

The zirconium oxide contained in the above composition is considered to improve the heat resistance of the catalyst as well as to increase the heat-resistance thereof since the same is very stable at a temperature as high as 1000°C. The nickel oxide has high reducing capacity of nitrogen oxides, so that in an atmosphere containing nitrogen monoxide and hydrogen gases, the nickel oxide can suppress the reaction of the nitrogen monoxide and hydrogen gases thereby to prevent the formation of ammonia. Moreover, the chromium oxide is considered to have high heat-resistance to be effective in stabilizing the nickel oxide and to act as a reduction catalyst at high temperatures.

Hence, the catalyst composition containing nickel oxide, chromium oxide and zirconium oxide displays a high activity or potency endurance and, particularly, high reducing capability of nitrogen oxides.

It has been found through a number of experiments conducted by the present inventors that the catalyst composition is preferred to contain a total of about 0.2 to 3.1 moles of nickel and chromium both in the oxide form per 1 liter of a carrier.

The concentrations of nickel and chromium as above specified is important. If the concentrations are short of 0.2 moles per 1 liter of a carrier, then the catalyst fails to be active on the air-pollutants. On the other hand, if the oxides of nickel and chromium are carried on 1 liter of a carrier in an amount over 3.1 moles, when calculated as metals, the activity or potency of the catalyst decreases presumably by reason of the decreased surface area.

Furthermore, the concentrations of the metal components of nickel oxide and chromium oxide are preferable within a range of 0.1 to 3.0 moles, respectively. Furthermore, it is necessary to select the molar ratio between nickel and chromium as well as the total amount of nickel and chromium mentioned above, since the properties of the catalyst are largely affected by the molar ratio therebetween. The molar ratio between nickel and chromium should preferably be within a range of 20 : 1 to 1 : 5. The optimum ratio should be selected from the above range in consideration of the conditions to be used and the desired properties of the catalyst. The catalyst containing nickel oxide in a higher ratio is suitable to carry out the catalytic reaction at relatively low temperatures. On the other hand, in case of the catalyst containing chromium oxide in a higher molar ratio, the temperatures at which the catalytic reaction occurs become relatively high. However, chromium oxide has excellent heat-stability, so that the chromium-rich catalyst is suited to continuously carry out the reaction at high temperatures. A catalyst within the molar ratio mentioned above can accomplish the objects of the present invention.

The metal component of the zirconium oxide contained in the catalyst composition is preferred to be about 1/50 to 1/5 of the total molar concentration of the metal components of nickel and chromium oxides. If the molar ratio of zirconium is less than 1/50, then there is no effect. Also, if the ratio is more than 1/5, the activity or potency of the catalyst is reduced.

In order to further improve the activity or potency and endurance of the catalyst mentioned above, extensive studies have been made by adding various types of metal oxides to the catalyst of the nature mentioned above. As a result, the present inventors have found that the activity or potency of each of the oxides of nickel, chromium and zirconium is remarkably enhanced when one of manganese, zinc, copper and iron oxides is added to the nickel, chromium and zirconium oxides. Such metals and the oxides thereof are respectively selective to gas components to be treated. Hence, one of manganese, zinc, copper and iron oxides should suitably be selected in accordance with the kinds of gas components to be treated.

The total metal component concentration of one of manganese, zinc, copper and iron oxides should be in a range lower than that of nickel oxide and should preferably be in a range of 0.01 to 2.0 moles. The catalyst composition of the present invention is suitable for use as a reduction catalyst for the nitrogen oxides, but it should be noted that the above mentioned catalyst composition may also be used as an oxidation catalyst of hydrocarbons and carbon monoxide contained in exhaust gases when a suitable amount of oxygen or air is supplied to the exhaust gases.

The carrier may be of the priviously defined monolithic or of the non-monolithic type. The monolithic type carrier may be formed from a material containing alumina such as cordierite, beta-spodumene or alpha-alumina. Where, on the other hand, a non-monolithic carrier type such as pellets or tablets is preferred, the same may be formed from a material containing alumina such as alpha-alumina, gamma-alumina, delta-alumina or chi-alumina. If desired, the monolithic carrier formed of cordierite, beta-spodumene or alpha-alumina as above mentioned may be improved by depositing an activated alumina such as gamma-alumina or kappa-alumina on the surface of the base material. The methods of preparing a catalyst of the present invention will be described below.

One of the methods comprises the steps of: immersing a carrier in a solution of a mixture of salts of nickel, chromium and zirconium in such a manner that the suitable amounts of nickel, chromium and zirconium which have been defined hereinbefore all in the oxide form are deposited; and sintering the resultant carrier at a temperature of 600°C to 900°C.

The nickel salt may be nickel nitrate, nickel acetate, nickel chloride or ammonium nickel chloride, and the chromium salt may be chromium nitrate, chromium bromide, chromium chloride or chromium sulfate. The zirconium salt may be zirconyl nitrate, zirconium nitrate, zirconium chloride or zirconium iodide. Further, one salt of manganese, zinc, copper and iron may be added to the solution. In this case, water-soluble salts of these metals such as a nitrate, acetate, chloride, iodide, bromide, etc., may be used as the salt.

The catalyst of the present invention can also be prepared by first mixing nickel hydroxide powder, chromium hydroxide powder and zirconium hydroxide powder prepared by a precipitation method, and powder of activated alumina or alumina sol; moulding the resultant mixture into a suitable form; and sintering the mould to give a catalyst. One of zinc, copper, manganese and iron hydroxides may be added at the mixing step to improve the properties of the catalyst.

The present invention will be further explained by the following specific but non-limiting examples. In order to investigate the catalyst compositions, various kinds of metal salts are carried on a carrier by an impregnation or immersing method and the resultant carrier is sintered at high temperatures to form a metal oxide catalyst. Furthermore, though the carrier used is mainly in the form of pellets or spheres of low cost, the results obtained are applicable to a monolithic carrier.

EXAMPLE 1

1 liter of a commercially available chi-alumina carrier (6 – 9 mesh per inch) was immersed in 1.42 liters of an aqueous solution of a mixture of nickel nitrate, chromium nitrate and zirconium nitrate in which 2.13 moles of nickel ions, 2.13 moles of chromium ions and 0.213 moles of zirconium ions were contained in 1 liter of the solution. The thus immersed carrier was removed from the solution, dried at 120°C for 15 hours and sintered in a stream of air at 700°C for 3 hours. The resultant catalyst contained metal oxides in which 1.0 mole of nickel, 1.0 mole of chromium and 0.1 moles of zirconium were present in 1 liter of the catalyst.

EXAMPLE 2

1 liter of a commercially available alpha-alumina carrier (6 – 8 mesh per inch) was immersed in 1.24 liters of an aqueous solution of a mixture of nickel nitrate, chromium nitrate and zirconium nitrate in which 3.2 moles of nickel ions, 3.2 moles of chromium ions and 0.32 moles of zirconium ions were contained in 1 liter of the solution. Then, the treatment of Example 1 was repeated. The resultant catalyst had the same composition and concentration of metal oxides as that of Example 1, but the kind of alumina used was different from that of Example 1.

EXAMPLE 3

1 liter of the same kind of alpha-alumina as used in Example 2 was immersed in 1.24 liters of an aqueous solution of a mixture of nickel nitrate, manganese nitrate, chromium nitrate and zirconium nitrate in which 3.2 moles of nickel ions, 1.6 moles of manganese ions, 1.6 moles of chromium ions and 0.32 moles of zirconium ions were contained in 1 liter of the solution. Then, the treatment of Example 1 was repeated. The resultant catalyst contained metal oxides in which 1.0 mole of nickel, 0.5 moles of manganese, 0.5 moles of chromium and 0.1 moles of zirconium were present in 1 liter of the catalyst.

EXAMPLE 4

1 liter of the same kind of alpha-alumina as used in Example 2 was immersed in 1.24 liters of an aqueous solution of a mixture of nickel nitrate, copper nitrate, chromium nitrate and zirconium nitrate in which 3.2 moles of nickel ions, 1.6 moles of copper ions, 1.6 moles of chromium ions and 0.32 moles of zirconium ions were contained in 1 liter of the solution. Then, the treatment of Example 1 was repeated. The resultant catalyst contained metal oxides in which 1.0 mole of nickel, 0.5 moles of copper, 0.5 moles of chromium and 0.1 moles of zirconium were present in 1 liter of the catalyst.

EXAMPLE 5

1 liter of the same kind of alpha-alumina carrier as used in Example 2 was immersed in 1.24 liters of an aqueous solution of a mixture of nickel nitrate, zinc nitrate, chromium nitrate and zirconium nitrate in which 3.2 moles of nickel ions, 1.6 moles of zinc ions, 1.6 moles of chromium ions and 0.32 moles of zirconium ions were contained in 1 liter of the solution. Then, the treatment of Example 1 was repeated. The resultant catalyst contained metal oxides in which 1.0 mole of nickel, 0.5 moles of zinc, 0.5 moles of chromium and 0.1 moles of zirconium were present in 1 liter of the catalyst.

EXAMPLE 6

1 liter of the same kind of alpha-alumina carrier as used in Example 2 was immersed in 1.24 liters of an aqueous solution of a mixture of nickel nitrate, iron nitrate, chromium nitrate and zirconium nitrate in which 3.2 moles of nickel ions, 3.2 moles of iron ions, 0.32 moles of chromium ions and 0.32 moles of zirconium ions were contained in 1 liter of the solution. Then, the treatment of Example 1 was repeated. The resultant catalyst contained metal oxides in which 1.0 mole of nickel, 1.0 mole of iron, 0.1 moles of chromium and 0.1 moles of zirconium were present in 1 liter of the catalyst.

EXAMPLE 7

1 liter of the same kind of alpha-alumina as used in Example 2 was immersed in 1.24 liters of an aqueous solution of a mixture of nickel nitrate, iron nitrate, chromium nitrate and zirconium nitrate in which 3.2 moles of nickel ions, 1.6 moles of iron ions, 1.6 moles of chromium ions and 0.32 moles of zirconium ions were contained in 1 liter of the solution. Then, the treatment of Example 1 was repeated. The resultant catalyst contained metal oxides in which 1.0 mole of nickel, 0.5 moles of iron, 0.5 moles of chromium and 0.1 moles of zirconium were present in 1 liter of the catalyst.

EXAMPLE 8

A piece of a monolithic carrier having a cubic measurement or volume of 1 liter and made of beta-spodumene was immersed in 3.0 liters of an aqueous solution of a mixture of nickel nitrate, copper nitrate, chromium nitrate and zirconium nitrate in which 3.75 moles of nickel ions, 1.95 moles of copper ions, 1.95 moles of chromium ions and 0.375 moles of zirconium ions were contained in 1 liter of the solution. The thus immersed carrier was removed from the solution, dried at 120°C for 15 hours and sintered in a stream of air at 700°C for 5 hours. The resultant monolithic catalyst contained metal oxides in which 0.84 moles of nickel, 0.42 moles of copper, 0.42 moles of chromium and 0.084 moles of zirconium were present in 1 liter of the catalyst.

EXAMPLE 9

A piece of a monolithic carrier having a volume of 1 liter and made of beta-spodumene was immersed in a commercially available alumina sol, after which the thus immersed carrier was removed and sintered at 700°C for 3 hours by which the carrier was coated with gamma-alumina. The same process was further repeated two times so that a total of about 30% by weight of gamma-alumina was finally deposited on the beta-spodumene carrier. The alumina-coated monolithic carrier thus obtained was immersed in 3.0 liters of an aqueous solution of a mixture of nickel nitrate, iron nitrate, chromium nitrate and zirconium nitrate in which 2.34 moles of nickel ions, 1.2 moles of iron ions, 1.2 moles of iron ions and 0.234 moles of zirconium ions were present in 1 liter of the solution. The immersed carrier was removed from the solution, and then the treatment of Example 8 was repeated. The resultant monolithic catalyst contained metal oxides in which 0.7 moles of nickel, 0.35 moles of iron, 0.35 moles of chromium and 0.07 moles of zirconium were present in 1 liter of the catalyst.

EXAMPLE 10

A piece of a monolithic carrier having a volume of 0.785 liters and made of cordierite was immersed in 3.0 liters of an aqueous solution of a mixture of nickel nitrate, copper nitrate, chromium nitrate and zirconium nitrate in which 1.5 moles of nickel ions, 3.0 moles of copper ions, 3.0 moles of chromium ions and 0.3 moles of zirconium ions were contained in 1 liter of the solution. The thus immersed monolithic carrier was removed from the solution, and then the treatment of Example 8 was repeated. The resultant catalyst contained metal oxides in which 0.33 moles of nickel, 0.66 moles of copper, 0.66 moles of chronium and 0.066 moles of zirconium were present in 1 liter of the catalyst.

EXAMPLE 11

A monolithic carrier of cordierite measuring 0.785 liters by volume was coated by a total of 23% by weight of gamma-alumina in the same manner as in Example 9. The piece of the coated monolithic carrier was immersed in 3.0 liters of an aqueous solution of a mixture of nickel nitrate, iron nitrate, chromium nitrate and zirconium nitrate in which 1.41 moles of nickel ions, 2.82 moles of iron ions, 2.82 moles of chromium ions and 0.282 moles of zirconium ions were present. The thus immersed monolithic carrier was removed from the solution, and then the treatment of Example 8 was repeated. The resultant catalyst contained metal oxides in which 0.33 moles of nickel, 0.66 moles of iron, 0.66 moles of chromium and 0.066 moles of zirconium were present in 1 liter of the catalyst.

EXAMPLE 12

A piece of a monolithic carrier of alpha-alumina measuring 1 liter by volume was immersed in 3.0 liter of an aqueous solution of a mixture of nickel nitrate, iron nitrate, chromium nitrate and zirconium nitrate in which 1.74 moles of nickel ions, 3.6 moles of iron ions, 3.6 moles of chromium ions and 0.32 moles of zirconium ions were contained in 1 liter of the solution. The thus immersed monolithic carrier was removed from the solution, and then the treatment of Example 8 was repeated. The resultant monolithic carrier contained metal oxides in which 0.49 moles of nickel, 0.75 moles of iron, 0.75 moles of chromium and 0.075 moles of zirconium were present in 1 liter of the catalyst.

Four different catalysts were prepared as representative examples of the prior art catalysts for comparison with those prepared in accordance with the present invention as described in the above examples.

COMPARATIVE EXAMPLE 1

1 l of a commercially available activated chi-alumina carrier having a particle size of 6 – 8 mesh per inch was immersed in 1.41 l of an aqueous solution of a mixture of ferric nitrate and chromium nitrate in which 2.13 moles of ferric ions and 2.13 moles of chromium ions were present in 1 liter of the solution. The resultant carrier was removed from the solution, dried at 120°C for 15 hours and sintered in a stream of air at 700°C for 3 hours. 1.0 mole of iron and 1.0 mole of chromium were contained in the oxide form per 1 liter of the resultant catalyst.

COMPARATIVE EXAMPLE 2

Example 1 was repeated except that instead of the aqueous solution of a mixture of ferric nitrate and chromium nitrate, an aqueous solution of a mixture of copper nitrate and chromium nitrate was used in which 1.06 moles of copper ions and 2.13 mmoles of chromium ions were contained in 1 liter of the solution to give a catalyst of oxides of copper and chromium. 0.5 moles of copper and 1.0 mole of chromium were contained in the oxide form per 1 liter of the catalyst.

COMPARATIVE EXAMPLE 3

1 liter of a commercially available activated chi-alumina carrier having a particle size of 6 – 12 mesh per inch was immersed in 1.41 liters of an aqueous solution of a mixture of ferric nitrate, manganese nitrate and chromium nitrate in which 2.13 moles of ferric ions, 1.06 moles of manganese ions and 2.13 moles of chromium ions were contained in 1 liter of the solution. The resultant carrier was removed from the solution, dried and sintered in the same manner as in Comparative Example 1. The resultant catalyst contained therein metallic oxides in which 1.0 mole of iron, 0.5 moles of manganese and 1.0 mole of chromium were present in 1 liter of the catalyst.

COMPARATIVE EXAMPLE 4

1 liter of a commercially available alpha-alumina carrier having a particle size of 8 mesh per inch was immersed in 1.28 liters of an aqueous solution of a mixture of ferric nitrate and chromium nitrate in which 3.2 moles of ferric ions and 3.2 moles of chromium ions were present in 1 liter of the solution. Then, the treatment of Comparative Example 1 was repeated. The resultant catalyst contained in the oxide form 1 mole of iron and 1 mole of chromium in 1 liter of the catalyst.

Tests were conducted with the catalysts prepared according to Examples 1 to 12 and Comparative Examples 1 to 4 to determine the activities or potencies thereof. Gases A and B having the compositions indicated in Table 1 below were used as models in the test, wherein the model gas A was used for oxidation reactions while the model gas $B_1$ was used for reduction reactions. The oxidation and reduction reactions were performed at a space velocity of 15,000 hr$^{-1}$. The temperature of the catalyst bed was varied in a range of 100 to 600°C so that a general relation between temperatures and the efficiencies of conversion of nitrogen monoxide, carbon monoxide and/or propane was determined. The efficiency of conversion herein mentioned is intended to mean a proportion in percentage of carbon monoxide, propane or nitrogen monoxide converted into innocuous compounds such as carbon dioxide, nitrogen and water. Furthermore, the concentration of ammonia formed as a secondary reaction product was determined with respect to the model gas $B_1$.

TABLE 1

| Constituents | | Model gas A | Model gas $B_1$ |
|---|---|---|---|
| Carbon monoxide, | % by volume | 2.0 | 2.0 |
| Propane, | ppm | 500 | 500 |
| Nitrogen monoxide, | ppm | 1000 | 1000 |
| Carbon dioxide, | % by volume | 12.0 | 12.0 |
| Oxygen, | % by volume | 2.5 | 0 |
| Hydrogen, | % by volume | 0 | 1.0 |
| Nitrogen | | Balance | Balance |

For comparison of activities or potencies between the catalysts prepared according to Examples 1 to 12 and Comparative Examples 1 to 4, temperatures at which the efficiencies of conversion of the carbon monoxide, propane and/or nitrogen monoxide reached 90 percent were used. On the other hand, though the quantity of formation of ammonia varied with the temperatures of the catalyst bed used, the maximal ammonia quantities formed were used for comparison. It is, in this instance, apparent that the lower the temperature providing the conversion efficiency of 90 percent, the higher is the low-temperature activity or potency of the catalyst. However, even if the activities of potencies of the catalysts are higher at low temperatures, it is disadvantageous in that the catalysts produce noxious secondary reaction products such as ammonia. Thus, it should be borne in mind, particularly in the reduction of nitrogen oxides, that even if the low-temperature activities or potencies of the catalysts are relatively low, the catalysts which are highly selective to main reactions are excellent in their properties.

Tests were further conducted to evaluate the capabilites of the catalysts to effect the conversion of carbon monoxide, hydrocarbons and/or nitrogen oxides into innocuous components for a prolonged period of time. For this purpose, the catalysts to be tested were positioned in a front muffler of an exhaust system of an automotive 4-cycle, 4-cylinder internal combustion engine having a 1600 cc displacement. The engine dynamometer used was of the type which is widely in use. The engine was powered by leadless gasoline and cyclically driven through modes of operation including acceleration, normal cruising, deceleration and idling or stopping under the conditions analogous to the endurance test standards established by AMA (Automobile Manufacturers Association, United States of America). Secondary air was introduced into the exhaust system upstream of the catalyst where the catalyst was used as an oxidation catalyst while, in the test in which the catalyst was used as a reduction catalyst, secondary air was not supplied to the exhaust system.

The catalysts which had been in use by running the engine to simulate 5000 km driving of a motor vehicle were tested for activity or potency with use of the model gases A and $B_1$, whereby temperatures providing the 90 percent conversion efficiency of the catalysts were again determined.

The 90 percent conversion temperature and maximal values of the ammonia quantities before and after the activity or potency tests on the catalysts prepared according to Examples 1 to 12 and Comparative Examples 1 to 4 are given in Table 2.

TABLE 2

| Catalyst | 90% Conversion Temperature °C | | | | | | Quantity of Formation Ammonia ppm | |
|---|---|---|---|---|---|---|---|---|
| | Fresh Catalyst Test | | | After Endurance Test | | | Fresh Catalyst Test | After Durability Test |
| | NO* | CO** | $C_3H_8$** | NO* | CO** | $C_3H_8$** | | |
| Example | | | | | | | | |
| 1 | 350 | — | — | 400 | — | — | 300 | 270 |
| 2 | 450 | — | — | 490 | — | — | 140 | 120 |
| 3 | 410 | — | — | 480 | — | — | 120 | 100 |
| 4 | 260 | — | — | 380 | — | — | 360 | 350 |
| 5 | 420 | — | — | 500 | — | — | 410 | 400 |
| 6 | 340 | — | — | 400 | — | — | 300 | 300 |
| 7 | 325 | — | — | 380 | — | — | 210 | 200 |
| 8 | 380 | — | — | 480 | — | — | 340 | 330 |
| 9 | 440 | — | — | 490 | — | — | 320 | 300 |
| 10 | 425 | — | — | 470 | — | — | 280 | 285 |
| 11 | 430 | — | — | 480 | — | — | 240 | 260 |
| 12 | 400 | — | — | 460 | — | — | 240 | 230 |

TABLE 2 — Continued

| Catalyst | 90% Conversion Temperature °C | | | | | | Quantity of Formation Ammonia ppm | |
|---|---|---|---|---|---|---|---|---|
| | Fresh Catalyst Test | | | After Endurance Test | | | Fresh Catalyst Test | After Durability Test |
| | NO* | CO** | C$_3$H$_8$** | NO* | CO** | C$_3$H$_8$** | | |
| Comparative Example | | | | | | | | |
| 1 | 290 | — | — | 510 | — | — | 810 | 760 |
| 2 | 320 | 315 | 405 | 490 | 395 | 445 | 710 | 740 |
| 3 | 300 | — | — | 520 | — | — | 720 | 740 |
| 4 | 340 | 340 | — | 480 | 420 | — | 830 | 760 |

Note: The signs "*" and "**" indicate tests using the moled gases A and B$_1$, respectively.

As is apparent from Table 2, the catalysts represented by Examples 1 to 12 in accordance with the present invention are vastly superior in terms of endurance and of the quantity of noxious secondary reaction products formed such as ammonia to the prior art catalysts represented by Comparative Examples 1 to 4, though the catalysts of the present invention have low-temperature activities or potencies similar to those of the prior art.

What is claimed is:

1. A catalytic composition for treating exhaust gases containing hydrocarbons, carbon monoxide and oxides of nitrogen, consisting of a carrier and nickel oxide and chromium oxide in a total metal component amount of 0.2 to 3.1 moles and zirconium oxide of which metal component is in a molar ratio of 1/50 to 1/5 of the total metal component amount of said nickel oxide and chromium oxide per 1 liter of said carrier.

2. A catalytic composition as claimed in claim 1, wherein the molar ratio between nickel and chromium is within a range of 20 : 1 to 1 : 5.

3. A catalytic composition as claimed in claim 2, wherein the metal component of said nickel oxide is within a range of 0.1 to 3.0 moles per 1 liter of said carrier.

4. A catalytic composition as claimed in claim 2, wherein the metal component of said chromium oxide is within a range of 0.1 to 3.0 moles per 1 liter of said carrier.

5. A catalytic composition as claimed in claim 1, further consisting of the metal component of one of manganese, zinc, copper and iron in the oxide form in an amount of 0.01 to 2.0 moles per 1 liter of the carrier.

6. A catalytic composition as claimed in claim 1, wherein said carrier is of a monolithic type.

7. A catalytic composition as claimed in claim 6, wherein said carrier is formed from a material selected from the group consisting of cordierite, beta-spodumene and alpha-alumina.

8. A catalytic composition as claimed in claim 7, further including an activated alumina deposited on said material.

9. A catalytic composition as claimed in claim 8, wherein said activated alumina is selected from the group consisting of gamma-alumina and kappa-alumina.

10. A catalytic composition as claimed in claim 1, wherein said carrier is of a non-monolithic type.

11. A catalyst as claimed in claim 10, wherein said carrier is formed from a material selected from the group consisting of alpha-alumina, gamma-alumina, delta-alumina and chi-alumina.

12. A method of preparing a catalyst for use in treatment of exhaust gases containing carbon monoxide, hydrocarbons and nitrogen oxides, said method consisting of the steps of: forming a carrier in a suitable shape; immersing said carrier in a solution consisting of salts of nickel, chromium and zirconium; removing said carrier from said solution; and sintering the resultant carrier at a temperature of 600 to 900°C, said nickel and chromium being carried per 1 liter of said carrier in a total amount of 0.2 to 3.1 moles, both in an oxide form, and said zirconium being carried per 1 liter of said carrier in a molar ratio of 1/50 to 1/5 of the total amount of said nickel and chromium.

13. A method as claimed in claim 12, wherein the nickel salt is selected from the group consisting of nickel nitrate, nickel acetate, nickel chloride and ammonium nickel chloride.

14. A method as claimed in claim 12, wherein the chromium salt is selected from the group consisting of chromium nitrate, chromium chloride, chromium bromide and chromium sulfate.

15. A method as claimed in claim 12, wherein the zirconium salt is selected from the group consisting of zirconyl nitrate, zirconium nitrate, zirconium chloride and zirconium iodide.

16. A method as claimed in claim 12, wherein the oxides of nickel and chromium are carried 1 liter of said carrier within a range of 0.1 to 3.0 moles, when both calculated as metals, the molar ratio between said nickel and chromium being within a range of 20 : 1 to 1 : 5.

17. A method as claimed in claim 12, wherein said solution further consists of one of salts of manganese, zinc, copper and iron, in such a concentration that the metal component of said one is carried in an amount of 0.01 to 2.0 moles per 1 liter of said carrier in an oxide form when sintered.

18. A method as claimed in claim 17, wherein said one of salts is selected from the group consisting of nitrate, acetate, chloride, bromide and iodide.

19. A method of preparing a catalyst for use in treatment of exhaust gases containing carbon monoxide, hydrocarbons and nitrogen oxides, said method consisting of the steps of: mixing powder of nickel hydroxide, chromium hydroxide and zirconium hydroxide and powder of activated alumina; moulding the resultant mixture into a pre-selected form; and sintering the moulded form at a temperature of 600 to 900°C to give a catalyst consisting of nickel oxide, chromium oxide and zirconium oxide, the metal components of said nickel and chromium oxides being carried per 1 liter of said carrier in a total amount of 0.2 – 3.1 moles and the metal component of said zirconium oxide being carried per 1 liter of said carrier in a molar ratio of 1/50 – 1/5 of the total amount of the metal components of said nickel and chromium oxides.

20. A method as claimed in claim 19, wherein said powder of hydroxide further consists of one of manganese, zinc, copper and iron hydroxides in such a concentration that the metal component of said one of hydroxides is carried in an amount of 0.01 to 2.0 moles per 1 liter of said carrier in an oxide form when sintered.

21. A method of preparing a catalyst for use in treatment of exhaust gases containing carbon monoxide, hydrocarbons and nitrogen oxides, said method consisting of the steps of: mixing powder of nickel hydroxide, chromium hydroxide and zirconium hydroxide, and alumina sol; moulding the resultant mixture into a preselected form; and sintering the moulded form to give a catalyst consisting of nickel oxide, chromium oxide and zirconium oxide, the metal components of said nickel and chromium oxides being carried per 1 liter of said carrier in a total amount of 0.2 – 3.1 moles and the metal component of said zirconium oxide being carried per 1 liter of said carrier in a molar ratio of 1/50 to 1/5 of the total amount of the metal component of said nickel and chromium oxides.

* * * * *